Patented Feb. 11, 1930

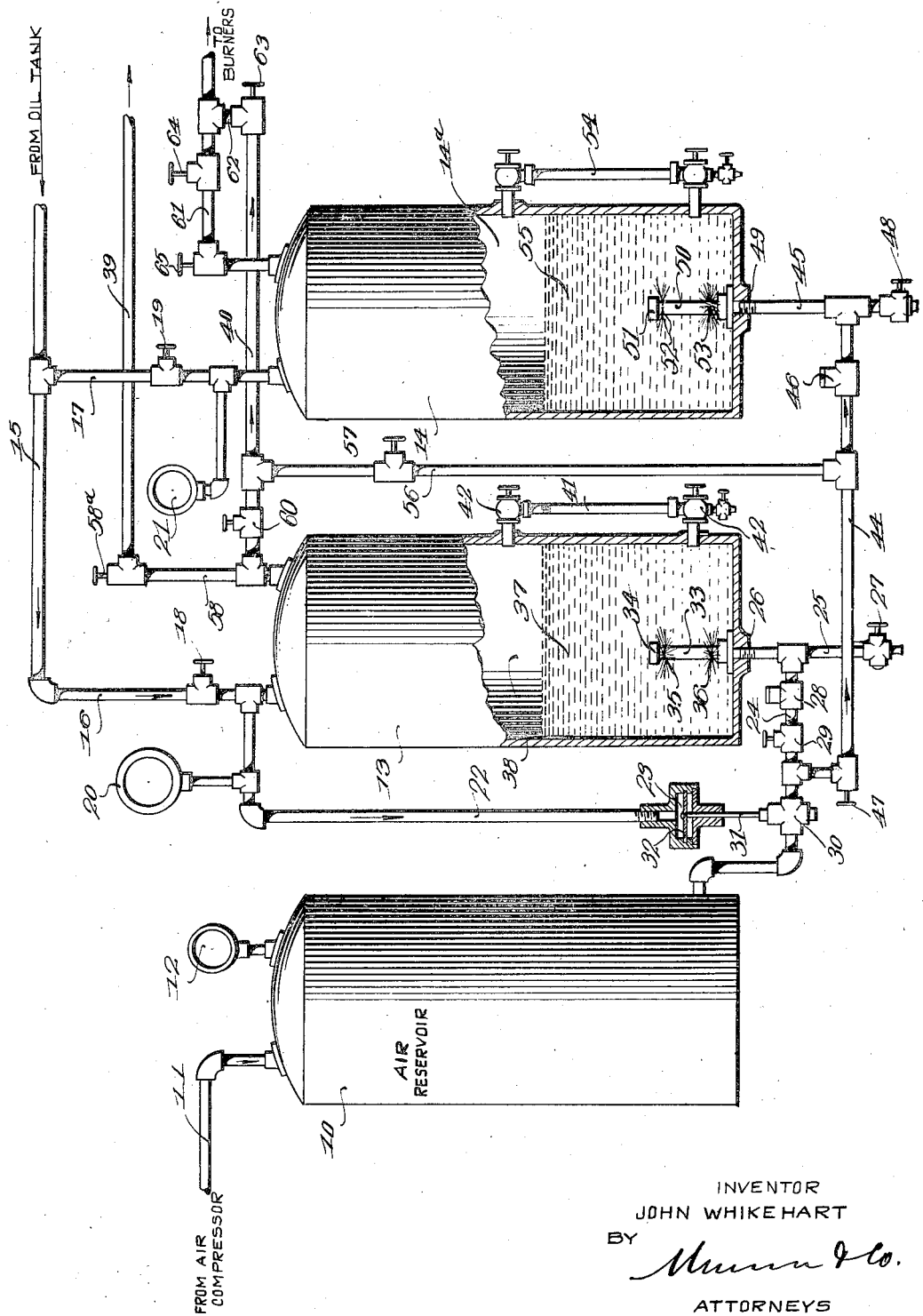

1,747,094

UNITED STATES PATENT OFFICE

JOHN WHIKEHART, OF ZANESVILLE, OHIO

APPARATUS FOR MAKING ILLUMINATING AND HEATING GAS

Application filed July 1, 1927. Serial No. 202,866.

This invention relates to a process and apparatus for making illuminating and heating gas, and motor power.

An object of the invention is the provision of a process for producing a gas adapted for use in heating or illuminating apparatus or motor power, and in which compressed air is forced through gasoline or oil by which a gas is produced in a confined space above the liquid consisting of gasoline or oil, before being conducted to the burners, or to the motors.

A further object of the invention is the provision of a process in which an automobile compressor maintains an air reservoir filled with air at a predetermined pressure, the air being conducted through a column of liquid consisting of gasoline or oil maintained in a confined space over which is a column of gas formed by the air passing through the liquid fuel, consisting of gasoline, is temporarily stored under predetermined pressure before the same is conducted to the burners, or any kind of motor power that can be operated with gas.

A further object of the invention is the provision of an apparatus for producing a gas from compressed air and liquid fuel, consisting of gasoline or oil, and stored in a container at a predetermined level through which air under pressure is forced to produce a combustible gas, the gas to be produced by the use of one tank, or more.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claim.

In the drawings:—

The figure is a view in elevation, partly in section of an apparatus adapted for carrying out my process.

Referring more particularly to the drawings 10 designates an air reservoir which is adapted to be supplied with compressed air through a pipe 11 which is connected with an air compressor, not shown. A gauge 12 is associated with the reservoir for indicating the pressure.

A pair of similarly constructed tanks 13 and 14 are ranged in close association and are supplied with liquid fuel consisting of gasoline or oil, from a common pipe 15 and branch pipes 16 and 17 which are respectively in communication with the tanks 13 and 14. A valve 18 controls communication between the branch pipe 16 and the tank 13, and the valve 19 controls communication between branch pipe 17 and tank 14. When the valves 18 and 19 are closed, pressure in the tanks above the liquid in said tanks is indicated respectively by the gauges 20 and 21. The gauge 20 is in communication with a pipe 22 which is connected between the branch pipe 16 and a pressure regulator shown at 23. The indicator 21 is in communication with the branch pipe 17.

A pipe 24 through various connections is placed in communication with the air reservoir and a pipe 25 which is in direct communication with the lower end of the tank 13 is screwed into an internally threaded hollow boss 26. The pipe 25 at times will also act as a drain for the tank when the valve 27 is open. The check valve 28 prevents the pressure in tank 13 from forcing the fuel in said tank into the reservoir 10, and a valve 29 is adapted to close communication between the pipe 24 and the pipe 25 when desired. A valve casing 30 is incorporated in the pipe 24 and houses a valve, not shown, which is connected to the stem 31 which in turn is rigidly secured to a diaphragm 32 whereby the pressure in the pipe 22 will actuate the diaphragm and stem for closing the valve in the casing 30 to control the flow of air from the reservoir to the pipe 25.

A spraying device generally designated by the numeral 33 is placed in communication with the inner end of the pipe 25 and has a closed upper end 34 and a pair of spaced series of perforations 35 and 36 adjacent the opposite end of the member 33 whereby compressed air from the reservoir 10 will be forced in fine jets through fuel 37, consisting of gasoline or oil, in the tank 13 for the production of a gas which is temporarily stored in the upper portion 38 of the tank, whence it is conducted by means of a pipe 39 or 40 to the burners, or to the motor.

A pipe 41 which is transparent is supported by hollow brackets 42 which place the pipe 41 in communication with the tank 13 for indicating the level of the liquid in said tank.

A pipe 44 is connected with pipe 24 and also with a pipe 45 for placing the tank 14 in communication with the air reservoir 10. A check valve 46 in the pipe 44 will prevent fluids in the tank 14 from passing back to the reservoir. A valve 47 is adapted to cut off the compressed air to the pipe 44.

The pipe 35 may act as a drain when the valve 47 is closed and a valve 48 is open. The upper end of the pipe 45 is threaded into an internally threaded hollow boss 49 which is in direct communication with a spraying device 50. The spraying device 50 consists of a hollow cylindrical member closed at its upper end 51 and provided with spaced series of perforations 52 and 53.

A liquid level indicator 54 is connected with the tank 14 whereby it is possible to tell by inspection the height of the liquid 55 in said tank. A pipe 56 connects pipe 44 with the pipe 40. A valve 57 is adapted to cut off communication between the two pipes. The pipe 40 is also connected with the pipe 58 which is likewise in communication with pipe 39. A valve 60 is located in the pipe 40 between the connection with the pipe 56 and 58.

A pipe 61 is connected with the tank 14 at the upper end and is in communication with pipe 40 by a short connection 62. A valve 63 closes communication between the pipes 40 and 61. A valve 64 is incorporated in the pipe 61 as is a valve 65.

The operation of my device is as follows:

Air from the reservoir is conducted to the spraying device 33 and the valve 29 is open and this air under pressure passes through the fuel 37 filling the space 38 after which it is conducted by either the pipes 58 and 39 or the pipes 58 and 40 to the burners, after the valve 63 has been open. Air is admitted through pipe 56 to the pipe 40 for adulterating a gas before it is directed to the burners, the extent of adulteration being controlled by the degree of opening of the valve.

When it is desired to open the tank 14 in conjunction with the tank 13 valve 47 is opened whereby compressed air is conducted from the spraying device 50 whence the air is forced through fuel 55 in tank 14 filling the space 14 above the fuel, after which it is conducted by the pipe 61 to the burners. The pipe 40 when the valves 57 and 63 have been opened will conduct compressed air through pipe 61 for adulterating the gas before it is supplied to the burners, or motors.

The pipe 15 is connected with an oil tank and through the branches 16 and 17 supplies the tanks 13 and 14 with fuel after the valves 18 and 19 have been actuated to open position. The level of the fuel in the tank is determined by the gauges 41 and 54.

The air reservoir is supplied with compressed air from a compressor which is automatic in operation and which will stop periodically when the air has reached a predetermined pressure in the pipe lines leading to said reservoir.

I claim:—

An apparatus for producing an illuminating gas comprising a reservoir adapted to be filled with compressed air, a tank partly filled with a liquid fuel, a pipe connecting the air reservoir with the tank, a pressure regulator controlling the flow of air to the tank, a second fuel tank partly filled with liquid fuel, a branch pipe connecting the reservoir with the second fuel tank, a valve controlling the flow of compressed air to the second fuel tank, a spray pipe mounted within each fuel tank, one spray pipe being in communication with the first-mentioned pipe, the other spray pipe being in communication with the branch pipe, the inner end of each spray pipe being closed, portions of each spray pipe being provided with a plurality of perforations located at different horizontal levels, said tanks having a space above the fuel for storing the combustible mixture formed by the spraying of the compressed air through the fuel, a conduit for each tank for conducting the combustible mixture away from the top of the tank, and a pipe connecting the branch pipe with the conduits which conduct the mixture from the tank for diluting the mixture with compressed air, and means for controlling the flow of compressed air to the last-mentioned conduits.

JOHN WHIKEHART.